United States Patent [19]

Knibbe

[11] Patent Number: 4,825,292

[45] Date of Patent: Apr. 25, 1989

[54] PICTURE PICK-UP DEVICE INCLUDING A SOLID-STATE SENSOR AND OPERATING WITH A SIGNAL INTERFERENCE REDUCTION

[75] Inventor: Engel J. Knibbe, Eindhoven, Netherlands

[73] Assignee: U.S. Philips Corporation, New York, N.Y.

[21] Appl. No.: 145,859

[22] Filed: Jan. 20, 1988

[30] Foreign Application Priority Data

Jan. 27, 1987 [NL] Netherlands ............ 8700188

[51] Int. Cl.$^4$ ............................................. H04N 3/15
[52] U.S. Cl. ........................... 358/213.24; 358/213.26; 358/213.23
[58] Field of Search ............ 358/213.26, 213.23, 358/213.24, 213.25; 357/24 LR

[56] References Cited

U.S. PATENT DOCUMENTS

| | | | |
|---|---|---|---|
| 4,104,543 | 8/1978 | Maeding | 357/24 |
| 4,490,744 | 12/1984 | Levine | 358/213.24 |
| 4,577,115 | 3/1986 | Rentsch et al. | 358/213.26 |
| 4,731,656 | 3/1988 | Dischert et al. | 358/213.26 |
| 4,731,665 | 3/1988 | Hashimoto et al. | 358/213.26 |

Primary Examiner—Jin F. Ng
Assistant Examiner—Stephen Brinich
Attorney, Agent, or Firm—Edward W. Goodman

[57] ABSTRACT

A pictue pick-up device includes a solid-state sensor that may be in the form of a frame transfer device (FT) in which smear is present as a signal interference. The sensor (FT) comprises a picture pick-up member (PP) having picture pick-up elements (P) which are sensitive to picture information from a scene to be recorded. A first and a second shift register member (SR1 and SR2) are coupled via first and second storage members (MP1, MP2), respectively to the picture pick-up member (PP). The first and second shift register members (SR1, SR2) have capacitive couplings (FG1, FG2) with first and second outputs (FT1, FT2), respectively of the sensor (FT) for supplying a signal with picture information and smear as interference and for supplying only smear as interference, respectively. The sensor outputs (FT1 and FT2) are connected to respective inputs (AT1 and AT2) of a differential amplifier (A). It is essential that during the performance of the interference reduction the second (FT2) or the first sensor output have a DC connection (FT2, AT2) with an electrically floating potential to a (+) amplifier input (AT2) and that the first (FT1) or the second sensor output have a DC connection to the (−) amplifier input (AT1) and that both sensor outputs (FT1 and FT2) have a capacitive output impedance. As a result an optimum interference reduction at the sensor outputs (FT) is obtained by means of a charge packet comparison.

2 Claims, 4 Drawing Sheets

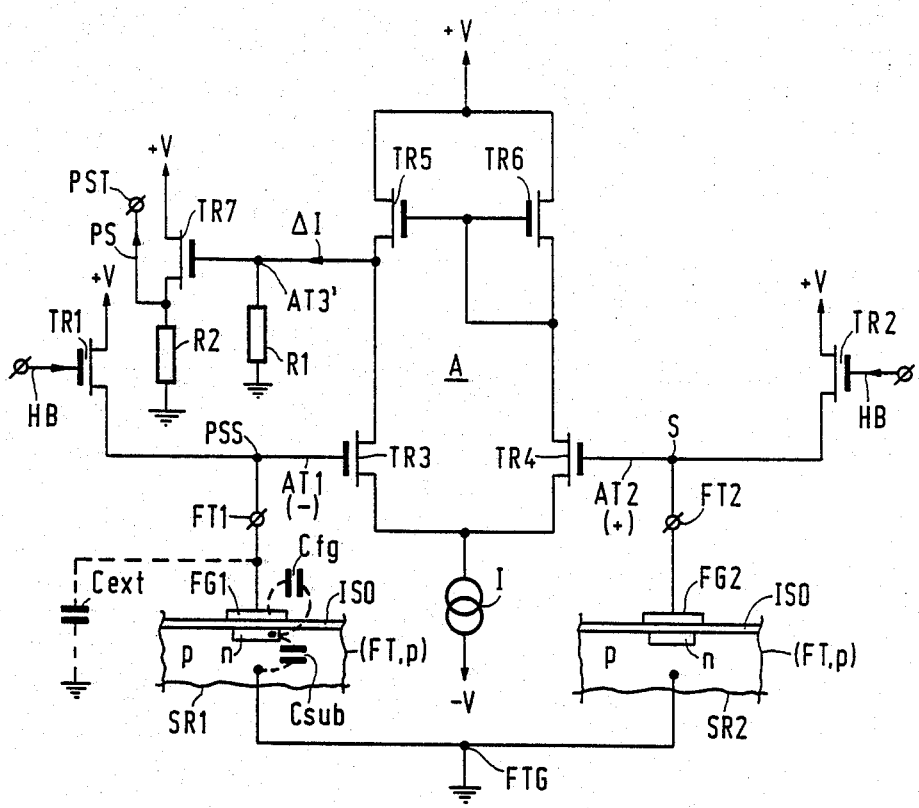
FIG.3a
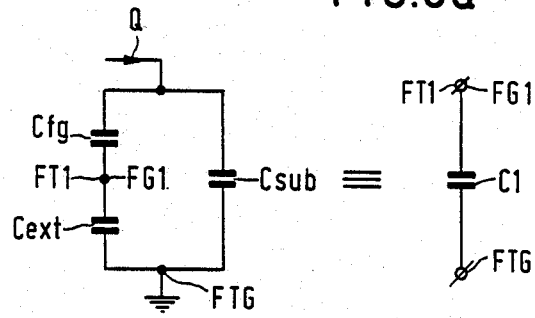
FIG.3b
FIG.3

PICTURE PICK-UP DEVICE INCLUDING A SOLID-STATE SENSOR AND OPERATING WITH A SIGNAL INTERFERENCE REDUCTION

BACKGROUND OF THE INVENTION

The invention relates to a picture pick-up device including a solid-state sensor and operating with signal interference reduction. The sensor comprises a picture pick-up member and a first and second shift register member, the picture pick-up member being formed with picture pick-up elements which are sensitive to picture information from a scene to be recorded, each shift register member, which is controllable by clock pulse signals, being formed with at least one parallel-in, series-out shift register having a controllable parallel input coupling with the picture pick-up elements. The first shift register member has a series output coupling with a first output of the sensor and the second shift register member has a series output coupling with a second output of the sensor, the first and second outputs of the sensor supplying a signal with picture information and interference and a signal with interference only, respectively, by means of the clock pulse control of the shift register members, the picture pick-up device for obtaining the interference reduction further including a differential amplifier having a non-inverting and an inverting input coupled to the first and the second output, respectively, of the sensor, and an output for the supply of a signal with picture information and reduced interference.

A picture pick-up device of this type is described in U.S. Pat. No. 4,490,744, more specifically in the form of a sensor having photosensitive picture pick-up elements. Furthermore, the sensor is in the form of a charge transfer device, more specifically a frame transfer device. The picture pick-up member is coupled via a storage member to the parallel inputs of the first shift register member, and the second shift register member is present on the opposite side of the picture pick-up member. The storage member and the shift register members are shielded from light. In the picture pick-up member, and the storage member the picture pick-up elements and storage elements, respectively, are arranged in rows and columns.

If the picture pick-up device operates as a television camera, the patent describes that for the purpose of generating signals, the picture information obtained in the picture pick-up member after a light integration period is transferred to the storage member upon commencement of a television field blanking period. Subsequently, the parallel transfer of the then "empty" picture pick-up member to the second shift register member is effected which thereby only receives signal smear in the form of a signal interference which is then read to the second output of the sensor. A memory device having a circulation time of one television line period is connected to the second sensor output. Instead of the memory device with the circulation, the patent also states the use of a digital random access memory. An output of the memory device with the signal conveying smear and delayed over one line period is coupled to the inverting input of the differential amplifier whose non-inverting input is connected to the first sensor output conveying the signal with picture information and smear. The coupling between the memory device and the differential amplifier comprises a gating circuit which is controlled via a threshold circuit from the signal conveying the picture information and the smear.

It is apparent that the smear is added columnwise once per field period and is subsequently utilized several times for the smear reduction during the line periods of the field period. This requires the line period memory device to be used in co-operation with the gating circuit and the threshold circuit.

SUMMARY OF THE INVENTION

It is an object of the invention to perform a signal interference reduction such as, for example smear reduction in a sensor having several rows of picture pick-up elements and operating as a frame transfer device or a so-called interline transfer device, or to perform signal interference reduction in the form of a clock pulse crosstalk reduction as may occur in one or more rows of picture pick-up elements without using further interference-producing extra components between the sensor outputs and the inputs of the differential amplifier. To this end, a picture pick-up device according to the invention is characterized in that, during the period when the differential amplifier is effectively operative for the interference reduction, the first or second output of the sensor has a DC connection with an electrically floating potential to the non-inverting input of the signal amplifier and the second or first output of the sensor has a DC connection to the inverting input of the differential amplifier, respectively, the two sensor outputs having a capacitive output impedance.

The invention is based on the recognition that in the capacitive state of the sensor output impedances and the supply of one of the two sensor output signals via the DC connection with the electrically floating potential to the non-inverting differential amplifier charge packets, which are present in the sensor and correspond to the sensor output signals, are directly and optimally utilized for the interference reduction. The capacitive sensor output impedances are, for example present in known manner at a floating gate electrode as an output electrode on the sensor.

It is to be noted that the signal interference reduction according to the invention can be used in the case of a clock pulse crosstalk reduction in a picture pick-up device as described in U.S. Pat. No. 4,145,721. In this device, the picture pick-up member is formed with one row of picture pick-up elements with the first and second shift register members being present on either side. The parallel transfer to the first shift register member from the picture pick-up elements filled with the picture information is followed by a blocked parallel coupling, a pseudo-coupling between the pick-up member and the second shift register member so that only the clock pulse crosstalk reaches this member. Subsequently, the sensor output signal with the picture information and the clock pulse crosstalk and the sensor output signal with the clock pulse crosstalk only is applied to the inverting and the non-inverting differential amplifier inputs, respectively, which are each also connected to ground via a resistor. Interruption of the resistive connection to ground at the non-inverting differential amplifier input makes it also possible for the charge packets in the sensor to be used directly and optimally for the clock pulse crosstalk reduction when using capacitive coupling-out at the sensor.

An embodiment of a picture pick-up device according to the invention, in which given properties of a differential amplifier type are utilized for optimum performance of the signal interference, is characterized in that the differential amplifier is of a type having a current output, in which the capacitances between the DC connections and ground are smaller by a factor of the order of at least ten as compared with the capacitances between the respective sensor outputs and an associated semiconductor region in a substrate of the sensor. An optimum efficiency during signal processing is obtained by this choice.

A further embodiment using a different differential amplifier type for optimum signal interference reduction, is characterized in that the differential amplifier is of a type having a voltage output in which a capacitance between the inverting input and the output of the differential amplifier is smaller by a factor of the order of at least ten as compared with the capacitance between the inverting input and ground.

An embodiment including a sensor having a storage member via which the picture pick-up member is coupled to the parallel inputs of at least the first shift register member, which picture pick-up member and storage member are formed with picture pick-up elements and storage elements respectively arranged in rows and columns and in which the parallel couplings are present in the column direction, is characterized in that the sensor has a second storage member, the members of the sensor in the direction of the parallel couplings having the following sequence: picture pick-up member, second storage member, second shift register member, first storage member and first shift register member.

Another embodiment of a picture pick-up device according to the invention also formed with a sensor having the storage member and the described structure is characterized in that the number of rows of storage elements of the storage member is larger than the number of rows of pick-up elements of the picture pick-up member, the members of the sensor in the direction of the parallel couplings having the following sequence: picture pick-up member, storage member, second and first shift register members or first and second shift register members, respectively.

BRIEF DESCRIPTION OF THE DRAWINGS

The invention will be described in greater detail by way of example with reference to the accompanying drawings, in which:

FIG. 3 shows a circuit diagram in FIG. 3a of a differential amplifier having a current output for use in a picture pick-up device according to the invention, and a circuit diagram in FIG. 3b with capacitances.

DETAILED DESCRIPTION OF THE INVENTION

Figure 1:
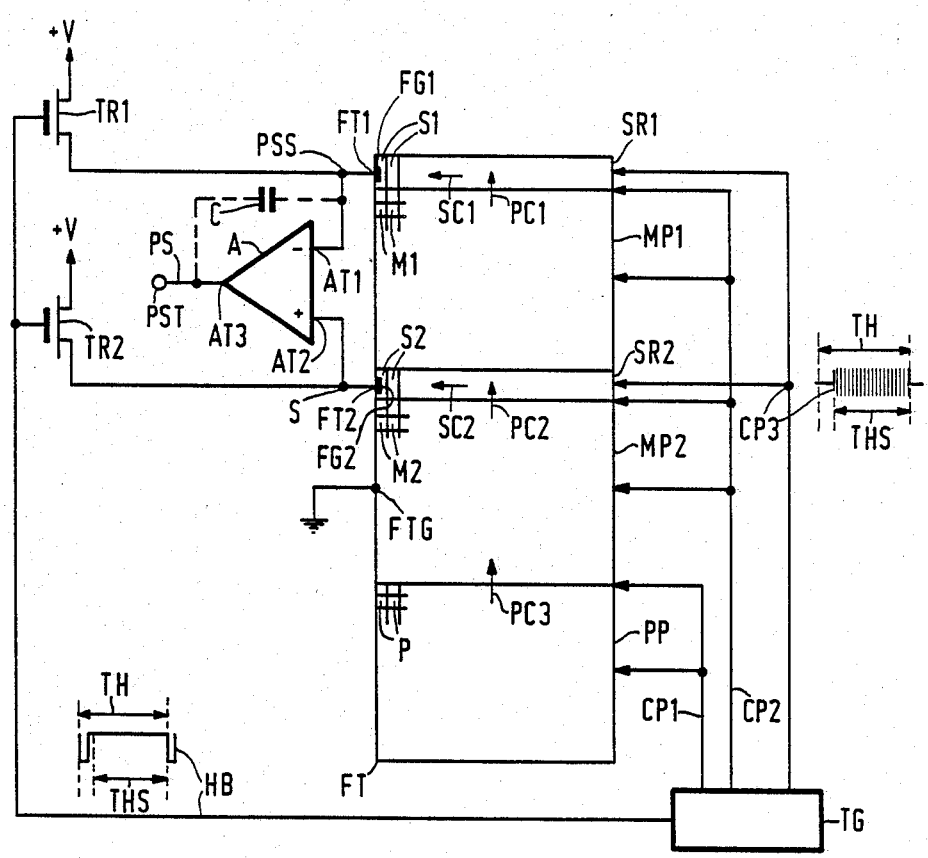
FIG. 1 shows an embodiment of a picture pick-up device according to the invention, including a sensor having the structure shown.

In the picture pick-up device of FIG. 1, the reference FT denotes a solid-state sensor. The sensor FT is shown with a picture pick-up member PP, a first and a second storage member MP1 and MP2, and a first and a second shift register member SR1 and SR2, respectively. The picture pick-up member PP and the storage members MP1 and MP2 comprise picture pick-up elements P and storage elements M1 and M2, respectively, arranged in rows and columns. The references PC1 and PC2 denote controllable parallel couplings between the storage members MP1 and MP2 and the shift register members SR1 and SR2, respectively. The reference PC3 denotes a controllable parallel coupling between the picture pick-up member PP and the storage member MP2. The parallel couplings PC are present in the column direction of the elements P, M1 and M2 in the manner shown. The shift register members SR1 and SR2 have shift register elements S1 and S2, respectively. The shift register members SR1 and SR2 are in the form of parallel-in, series-out shift registers. The couplings PC1 and PC2 are parallel input couplings, with SC1 and SC2 denoting series output couplings in the shift register members SR1 and SR2, respectively. Furthermore the shift register member SR2 may operate as a parallel-in, parallel-out shift register.

A time signal generator TG is shown in the picture pick-up device for the control of the sensor FT. The generator TG supplies clock pulse signals CP to the sensor FT and a switching signal HB to gate electrodes of two switching transistors TR1 and TR2 of the insulated gate electrode type. The connections with the clock pulse signals CP, shown by means of a single line for the sake of simplicity, will have a multiple form in practice for a, for example three or four-phase control of the sensor FT. A clock pulse signal CP1 is applied to the pick-up member PP for a columnwise information shift through the picture pick-up elements P. Furthermore the clock pulse signal CP1 ensures the information transfer between the pick-up member PP and the storage member MP2. Simultaneously, the information is shifted in the storage members MP2 and MP1 under the control of a clock pulse signal CP2, with the information being subsequently transferred through the shift register member SR2 and towards the shift register member SR1. A clock pulse signal CP3 ensures the serial information shift in the shift register members SR1 and SR2. As an example of the use of the sensor FT operating with line and field periods in television, a signal shape as a function of time is shown for the clock pulse signal CP3. The reference TH denotes a line period. The signal CP3 shows clock pulses during a line scan period THS of the period TH and a constant signal level during a line blanking period thereof, which is further not indicated. The switching signal HB is also shown with the line period TH with a switching pulse being present during the line blanking period. When used in television, the picture pick-up elements P are sensitive to visible light as picture information from a scene to be recorded, while the storage members MP and the shift register members SR are shielded from incident light. Instead of the sensitivity to visible light in the pick-up member PP, there might be a sensitivity to ultraviolet, infrared or X-ray radiation, etc., or to mechanical pressure.

The explanation of the operation of the sensor FT is based on its television use in which the sensor FT operates as a frame transfer device. In this case there is a light integration period per television field period, a subsequent picture information transfer period followed by a smear information transfer period. The transfer periods are within the field blanking period. During the picture information transfer period, picture information and smear is transferred as interference from the pick-up member P. During the smear transfer period, only the smear information is transferred. Ultimately the storage member M1 comprises the picture information with the smear as interference and the storage member M2 comprises only the smear information, because the pick-up member PP already emptied for the picture information is read once more. Subsequently the parallel transfer to the shift register members SR1 and SR2 takes place per line period TH during the line blanking period thereof and this is followed by a serial shift during the line scan period THS.

Figure 4:
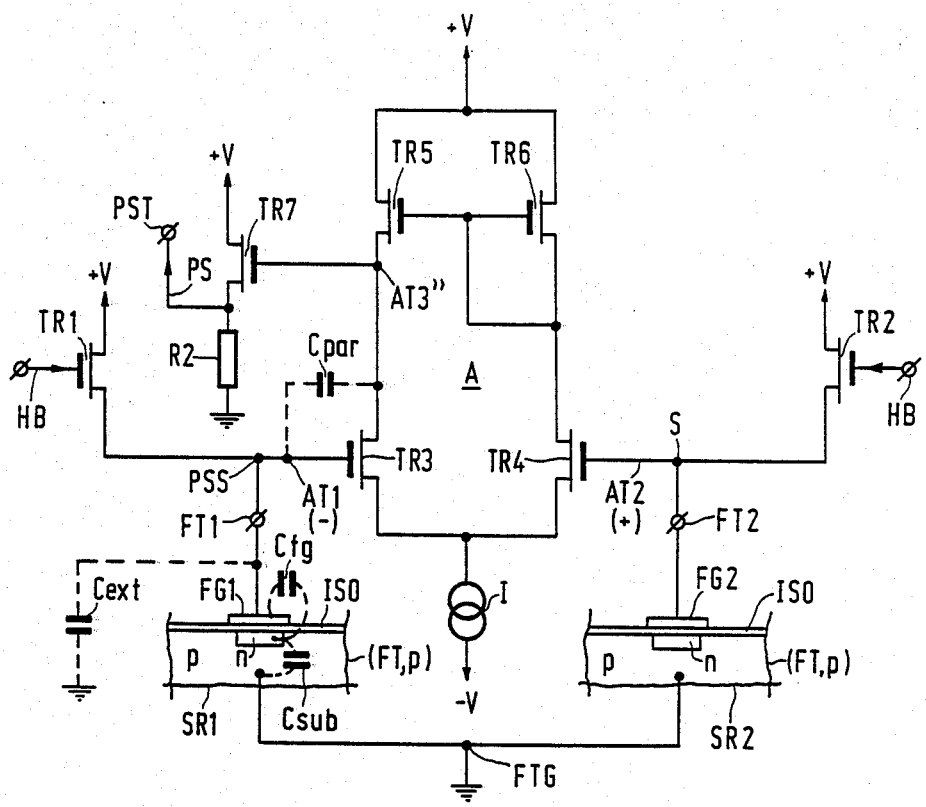
FIG. 4 shows a circuit diagram of a differential amplifier having a voltage output for use in a picture pick-up device according to the invention.

According to an aspect of the invention, the shift register members SR1 and SR2 each have the series output coupling SC with a sensor output FT1 and FT2, respectively having a capacitive output impedance. As an example is mentioned a coupling-out via floating gate electrodes present at the sensor FT, which electrodes are denoted in FIG. 1 by FG1 and FG2 at the shift register members SR1 and SR2, respectively. FIGS. 3a and 4 show diagrammatically the constructive structure as an example. The sensor FT has a substrate (FT,p) of p-type semiconductor material in which an n-type semiconductor material region is present. The substrate (FT,p) has an electrically insulating layer ISO on which above the n-regions the associated electrodes FG1 and FG2 occur at the shift register members SR1 and SR2, respectively. The n-region, the layer ISO and the electrode FG ensure the capacitive coupling-out (FG) at the sensor outputs FT1 and FT2, respectively. The reference FTG denotes a grounded terminal on the substrate (FT,p) of the sensor FT.

According to another aspect of the invention, the sensor outputs FT1 conveying a signal PSS with picture information and smear and FT2 conveying a signal S with smear only each have a DC connection (FT1, AT1) and (FT2, AT2) to inputs AT1 and AT2, respectively of a differential amplifier A. The Figure shows that the sensor outputs FT1 and FT2 are connected to the inverting (−) input AT1 and the non-inverting (+) input AT2, respectively, of the differential amplifier A and in this case it is essential that the DC connection (FT2, AT2) has an electrically floating potential during the line scan period THS. For this purpose the transistor TR2 connected to the output FT2 must be in its turned-off state during the line scan periods THS. The Figure shows that the source electrode of the transistor TR2 is connected to the sensor output FT2 and the drain electrode is connected to a supply voltage terminal +V. The supply voltage terminal +V forms part of a voltage source (not shown) having other terminals conveying a voltage −V or being connected to ground. The switching signal HB shown in FIG. 1 illustrates that the transistor TR2 and the transistor TR1 likewise connected to the sensor output FT1 are turned off during the line scan periods THS. The transistors TR1 and TR2 are present as reset transistors to compensate for charge losses occurring at the electrodes FG during the line blanking periods. A charge compensation during field blanking periods may also be considered. In the ideal case when there is no charge loss during the line periods TH, the transistors TR1 and TR2 may be absent. In the presence of the transistors TR1 and TR2 the differential amplifier A is effectively operative for the smear reduction during the line scan periods THS because these transistors are then turned off.

According to FIG. 1, the DC connection (FT1, AT1) has a capacitive coupling via a capacitance C with an output AT3 of the differential amplifier A. The capacitance C may be present as a capacitor or as a parasitic capacitance between the input AT1 and the output AT3. In both cases the DC connection (FT1, AT1) has a non-floating potential due to the capacitive coupling (C). The differential amplifier A forms a signal PS = −PSS +S which is applied via the output AT3 to an output terminal PST which thereby conveys the signal PS with picture information and reduced smear.

The smear reduction is effected to an optimum extent by the combination of the measure with the capacitive coupling-out (FT) at the outputs FT1 and FT2 of the sensor FT, the DC connections (FT, AT) between the sensor FT and the differential amplifier A and the signal supply via the floating connection (FT2, AT2) to the (+) input AT2. A given voltage step at the (+) input AT2 is produced by a given charge packet in the sensor FT below the electrode FG2 at the sensor output FT2 representing the smear information in the case shown. This voltage step is followed by the (−) input AT1, thus requiring one and the same charge packet to remain present in the sensor FT at the sensor output FT1. In fact, due to the identical structure the capacitances of the electrode FG, the substrate (FT,p) of the sensor FT and external connections for the two signal paths ae equal. The result is that in the case shown the charge packet part at the sensor output FT1 which corresponds to the smear is clustered below the electrode FG1 and that only the charge packet part corresponding to the picture information produces a voltage step at the output AT3 of the differential amplifier A. It is essential for clustering of the smear charge in the case shown that the DC connection (FT2, AT2) is electrically floating. Not shown is the other case in which the connections (FT1, AT2) and (FT2, AT1) are present. In this case only the current directions at the amplifier (A, C) and in the connection (FT2, AT1) are reversed which does not detract at all from the described charge cluster effect which then occurs at the sensor output FT1 and the charge packet comparison at the sensor outputs FT1 and FT2.

For obtaining the respective signals PSS and S at the sensor outputs FT1 and FT2, the sensor FT described with reference to the picture pick-up device of FIG. 1 has the structure with the following sequence of the sensor parts in the direction of the parallel couplings PC: the picture pick-up member PP, the second storage member MP2 for the smear information, the second shift register member SR2 for supplying the signal S with the smear only, the first storage member MP1 for the picture information with the smear as interference and the first shift register member SR1 for supplying the signal PSS with the picture information and the smear as interference. FIG. 1 shows that the surfaces, or in other words the number of rows of elements P, M1 and M2 of the members PP, MP1 and MP2 are equal to one another. Furthermore, a smear storage member MP2 may be considered with a smaller number of rows of storage elements M2. The smear information of a row must then be used for the smear reduction in several rows of storage elements M1. In this case the shift register member SR2 may operate with a repeatable read-out at the several rows, more specifically by means of a non-destructive signal read-out as performed, for example in a sensor formed as a charge injection device or by means of signal circulation.

Figure 2:
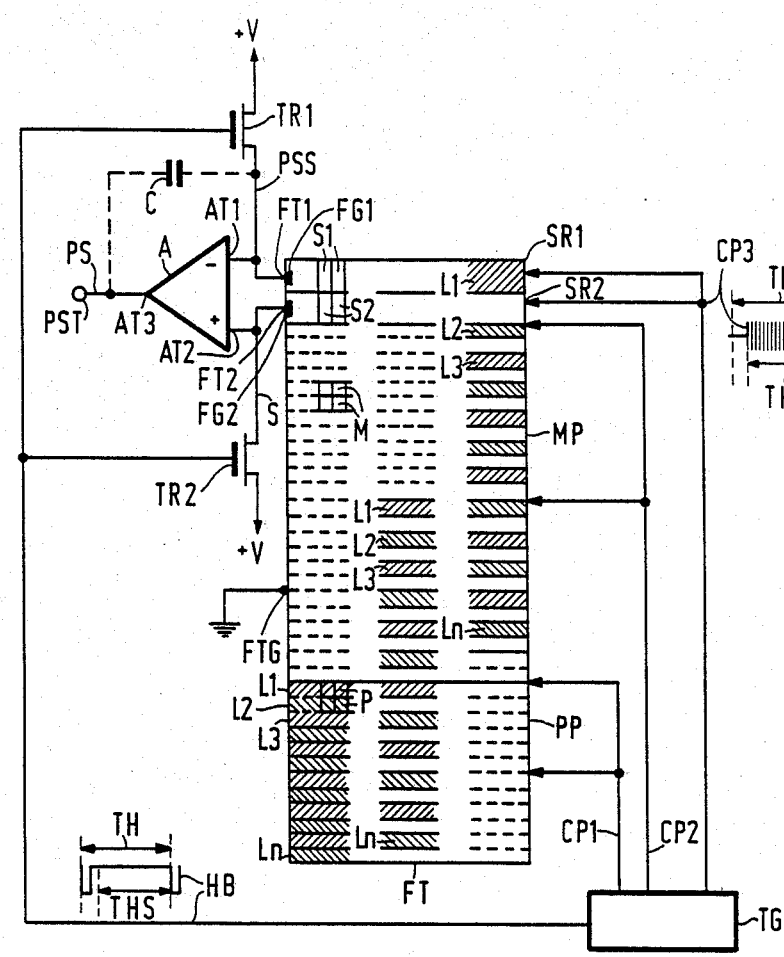
FIG. 2 shows a further embodiment including a sensor having a different structure.

FIG. 2 shows a different structure of the sensor FT. Components described in FIG. 1 have the same or adapted references in FIG. 2 and also in FIGS. 3a and 4. The picture pick-up member PP of the sensor FT is coupled via a single storage member MP to the shift register member SR2 and through this member to the shift register member SR1. The reference M denotes storage elements arranged in rows and columns, the number of rows of storage elements being larger than the number of rows of picture pick-up elements P. A factor of two follows from the example shown.

To explain the operation of the sensor FT of FIG. 2 including the members which, in the direction of the parallel coupling, have the sequence of the picture pick-up member PP, the storage member MP, the second shift register member SR2 and the first shift register member SR1, the following applies. In the members PP, MP and SR1 the local presence of picture information with smear as interference is denoted by shaded areas. The information distribution at three different instants is shown at the members PP, MP and SR1. The left-hand part in the sensor FT of FIG. 2 is associated with an instant at the end of a light integration period just before the commencement of the field blanking period with the parallel transfer of the pick-up member PP to the storage member MP. Then there is no longer any information in the storage member MP, which is illustrated by broken lines representing the empty rows of storage elements M. The references L1, L2, L3, etc. to Ln denote the picture information with the smear as interference, generated in the first, second, third and last row, respectively of picture pick-up elements P.

The central part in the sensor FT is associated with an instant which occurs in the middle of the parallel frame transfer period. This transfer is effected in an adapted manner by shifting the picture information L1 to the second row of storage elements M, while commencing with this information L1 generated in the first row of pick-up elements P and the picture information L2 is shifted to the first row of pick-up elements P. The second row of elements P is then empty. Subsequently, the picture information L1 is shifted one more memory row, the picture information L2 is shifted from the pick-up member PP in the first memory row and the picture information L3 goes to the second row of elements P, with the third row of elements P being empty. Continuing in this manner, the information pattern shown is present at the central instant of the parallel transfer. Between the rows of elements with picture information L there is always an empty row, a row of elements without picture information. The picture information Ln is shifted one row, leaving an empty row.

From the instant associated with the central part shown of the sensor FT, the information pattern shown is completely shifted to and in the storage member MP. Each shaded picture information L is followed by a nonshaded empty row. The smear information caused by the smear phenomenon is present in these "empty" rows. All picture information components L are present in the storage member MP at the end of the frame transfer period. Subsequently, the picture information L1 is transferred to the shift register member SR1 and the next "empty" row with the smear information reaches the shift register member SR2. The sensor FT is then ready to start with the supply of the signals PSS and S. The right-hand part shown in the sensor FT is associated with this instant. Due to the light integration at the pick-up member PP with the emptied rows of pick-up elements P shown in broken lines, these elements are filled again.

Instead of using the next "empty" row with the smear information for the smear reduction, it is possible to use the previous row for this purpose so that the designations SR1 and SR2 are interchanged. Furthermore, the storage member MP may have fewer rows of storage elements M. In this case several rows with picture information and smear as interference are located between two "empty" rows. The shift register member SR2 is then read as described with reference to FIG. 1 with a non-destructive signal read-out or signal circulation.

FIG. 3a shows a circuit diagram for a given type of differential amplifier A on which certain requirements must be imposed for performing an optimum smear or other interference reduction. The differential amplifier A of FIG. 3a is of a type having a current output denoted by AT3'. The amplifier A is formed with four transistors TR3, TR4, TR5 and TR6, the transistors TR3 and TR4 being source-coupled transistors and the transistors TR5 and TR6 constituting a current mirror circuit (TR5, TR6). The source electrodes of the transistors TR3 and TR4 are connected via a current source I to a supply voltage terminal $-V$. The drain electrodes of the transistors TR3 and TR4 are connected to the drain electrodes of the transistors TR5 and TR6, respectively, whose source electrodes are connected to a supply voltage terminal $+V$. The gate electrodes of the transistors TR5 and TR6 are connected together and to the drain electrode of the transistor TR6. It has been denoted at the gate electrodes of the transistors TR3 and TR4 that they constitute the $(-)$ input AT1 and the $(+)$ input AT2, respectively. The junction point between the transistors TR3 and TR5 is connected to the current output AT3' which is connected to ground via a resistor R1. Furthermore, the output AT3' is connected to a gate electrode of a transistor TR7 which operates as a source follower due to the connection of the drain electrode to a supply voltage terminal $+V$ and of the source electrode to ground via a resistor R2. The source electrode of the transistor TR7 is connected to the output terminal PST of the picture pick-up device. Instead of the source follower design, a cascode arrangement could be used.

For explaining the optimum operation of the differential amplifier A for the interference reduction, some capacitances are denoted at the shift register member SR1 of FIG. 3a which are also present (not shown) at the shift register member SR2. The capacitance of the connection leads which are connected to the sensor output FT1 and of the electrode FG1 with respect to ground is denoted by Cext. A capacitance Cfg is present between the electrode FG1 and the n-region in the substrate (FT,p) of the sensor FT. A capacitance Csub is present between the n-region and the grounded terminal FTG on the substrate (FT,p).

In FIG. 3b the capacitances Cext, Cfg and Csub are shown with their mutual connections in an equivalent circuit diagram. A charge packet representing the information is denoted by Q. The charge packet Q is given by the charge of electrons present in the n-region. The circuit diagram of FIG. 3b is again equivalent to a capacitance C1 shown as a single capacitor between the sensor output FT1 connected to the connection leads and to the electrode FG1, and the ground terminal FTG. The same capacitance C1 is present at the terminal FT2. In a formula it applies that $$C1 = Cext + Csub \cdot Cfg/(Csub + Cfg) \qquad (1)$$

The operation of the differential amplifier A with the current output AT3' is as follows for the case shown: a smear charge Q(S) below the electrode FG2 corresponding to the smear information will result in a given voltage step on the gate electrode of the transistor TR4. The equal smear load Q(S) below the electrode FG1 will result in an equal voltage step on the gate electrode of the transistor TR3. This does not unbalance the differential amplifier A. However, if there is also picture information which corresponds to a charge Q(PS) below the electrode FG1 at the sensor output FT1, it will disturb the balance in the differential amplifier A, more specifically by approximately a voltage which is equal to Q(PS) divided by C1, or Q(PS)/C1. By having ensured that the capacitance Cfg is larger by a factor of the order of at least ten than the capacitance Cext, it follows from formula (1) that C1=Cext+Csub. Consequently the balance disturbance leads to a current variation $\Delta I$ at the current output AT3' for which it applies that $\Delta I=(Q(PS)/(Cext+Csub))\cdot g$ A, with $g=\Delta I/\Delta V$ for the slope at the voltage-current characteristic of the transistor TR3. Due to the choice of the capacitance ratios and the optimum large input voltage step, an optimum efficiency is obtained during signal processing. The following capacitances are mentioned as an example: Cext=4 fF, Cfg=50 fF and Csub=1 fF, with C1≈5 fF.

Generally it holds that the capacitances Cext between the DC connections (FT, AT) and ground must be smaller by a factor of the order of at least ten than the capacitances Cfg between the respective sensor outputs FT1 and FT2 and the associated n-semiconductor regions in the substrate (FT,p) of the sensor FT. A factor of twelve and a half follows from the values given by way of example. The capacitance C1 can be measured by connecting all supply voltage terminals to ground for this purpose. The capacitance Cfg in series with Csub can be measured by disconnecting the connections at FT1 and FT2 for this purpose. The capacitance Cfg can be measured if a measuring point is available at the n-region, or it can be calculated from the configuration.

In the other case (not shown) in which the connections (FT1, AT2) and (FT2, AT1) are present, there is a disturbance of balance with the reverse sign and there are reversed current variations at the amplifier A.

The circuit diagram of FIG. 4 shows an embodiment of a differential amplifier having a voltage output AT3''. The differential amplifier A of FIG. 4 is different from that of FIG. 3a in that the resistor R1 is absent. In the embodiment of FIG. 4 a capacitance other than one of the capacitances Cext, Csub and Cgf plays a decisive role, namely the capacitance between the (−) input AT1 and the output AT3''. In FIG. 4 this capacitance is denoted by Cpar, but the capacitance may also be present as capacitor C of FIGS. 1 and 2.

The operation of the differential amplifier A of FIG. 4 with the voltage output AT3'' is as follows in the case shown: as described with reference to FIG. 3 the charge packets with the smear charge Q(S) will not disturb the balanced state of the differential amplifier A. However, when a charge packet with a picture information charge Q(PS) comes below the electrode FG1, it will initially disturb the balance of the differential amplifier A. The accompanying current variation at the transistor TR3 and the more or less constant current from the current mirror circuit (TR5, TR6) will result in the differential current charging the capacitance Cpar until the voltages at the gate electrodes of the transistors TR3 and TR4 are equal again or in other words until the balanced state is reached. This is the case when a voltage of Q(PS)/Cpar is present across the capacitance. In other words, the charge packet is passed on to the capacitance Cpar and has charged this capacitance. However, if the voltage variation at the drain electrode of the transistor TR3 is considered with respect to ground, not only the desired signal voltage but also an unwanted voltage is present, namely a voltage of approximately Q(S)/C1, assuming again that C1=Cext+Csub. To reduce the influence of the unwanted voltage, it is required for the capacitance C1 to have a much larger value than the capacitance Cpar. Generally it applies that the capacitance, for example Cpar present between the (−) input AT1 and the voltage output AT3'' of the differential amplifier A, must be smaller by a factor of the order of at least ten than the capacitance C1 between the (−) input AT1 and ground. An example is C1=5 fF and Cpar=0.25 fF in which a factor of twenty is present. The capacitance C1 can be measured when all supply connections are connected to ground. The capacitance Cpar can be measured when all supply connections are disconnected.

In the foregoing, the signal interference reduction is described as a smear reduction. A clock pulse crosstalk reduction is then effected simultaneously. If the cases where the solid-state sensor is formed in such a manner that there is no smear as interference, the foregoing remains valid for a reduction of the clock pulse crosstalk only. When using an interline transfer device as a sensor, the smear reduction may be subject to the clock pulse crosstalk reduction.

If the differential amplifier A and the sensor FT are jointly present in one integrated circuit, the sensor outputs FT1 and FT2 need not be physically present as terminals in the integrated circuit which then has only, for example the output terminal PST for further connection. This provides the advantage of the shortest possible connections (FT, AT) with the smallest possible capacitances.

What is claimed is:

1. A picture pick-up device including a solid-state sensor and operating with a signal interference reduction, said sensor comprising a picture pick-up member and first and second shift register members, said picture pick-up member being formed with picture pick-up elements which are sensitive to picture information from a scene to be recorded, each of said first and second shift register members being controllable by clock pulse signals and being formed with at least one parallel-in, series-out shift register having a controllable parallel input coupled with said picture pick-up elements, the first shift register member having a series output coupling with a first output of the sensor and the second shift register member having a series output coupling with a second output of the sensor, said first and second outputs of the sensor supplying a signal with picture information and interference and a signal with interference only, respectively, by means of clock pulse control of the first and second shift register members, said picture pick-up device, for obtaining the interference reduction, further inclduing a differential amplifier having a non-inverting and an inverting input coupled to the first and the second outputs, respectively, of the sensor and an output for supplying a signal with picture information and reduced interference, characterized in that during the period when the differential amplifier is effectively operative for the interference reduction, the first or second output of the sensor has a DC connection with an electrically floating potential to the non-inverting input of the signal amplifier and the second or first output of the sensor has a DC connection to the inverting input of the differential amplifier, respectively, the first and second sensor outputs having a capacitive output impedance, wherein the differential amplifier is of a type having a current output, in which capacitances between said DC connections and ground are smaller by a factor of the order of at least ten as compared with capacitances between the respective sensor outputs and an associated semiconductor region in a substrate of the sensor.

2. A picture pick-up device including a solid-state sensor and operating with a signal interference reduction, said sensor comprising a picture pick-up member and first and second shift register members, said picture pick-up member being formed with picture pick-up elements which are sensitive to picture information from a scene to be recorded, each of said first and second shift register members being controllable by clock pulse signals and being formed with at least one parallel-in, series-out shift register having a controllable parallel input coupled with said picture pick-up elements, the first shift register member having a series output coupling with a first output of the sensor and the second shift register member having a series output coupling with a second output of the sensor, said first and second outputs of the sensor supplying a signal with picture information and interference and a signal with interference only, respectively, by means of clock pulse control of the first and second shift register members, said picture pick-up device, for obtaining the interference reduction, further including a differential amplifier having a non-inverting and an inverting input coupled to the first and the second outputs, respectively, of the sensor and an output for supplying a signal with picture information and reduced interference, characterized in that during the period when the differential amplifier is effectively operative for the interference reduction, the first or second output of the sensor has a DC connection with an electrically floating potential to the non-inverting input of the signal amplifier and the second or first output of the sensor has a DC connection to the inverting input of the differential amplifier, respectively, the first and second sensor outputs having a capacitive output impedance, wherein the differential amplifier is of a type having a voltage output in which a capacitance between the inverting input and the output of the differential amplifier is smaller by a factor of the order of at least ten as compared with a capacitance between the inverting input and ground.

* * * * *